(12) United States Patent
Drouin et al.

(10) Patent No.: US 8,985,156 B2
(45) Date of Patent: Mar. 24, 2015

(54) EXTRACTION ASSEMBLY INCLUDING AN INFORMATION MODULE

(75) Inventors: Alexis Drouin, Toulouse (FR); Thomas Charrue, Vendome (FR)

(73) Assignee: Premium Protector, Toulouse (FR)

( * ) Notice: Subject to any disclaimer, the term of this patent is extended or adjusted under 35 U.S.C. 154(b) by 0 days.

(21) Appl. No.: 14/131,428

(22) PCT Filed: Apr. 3, 2012

(86) PCT No.: PCT/EP2012/056111
§ 371 (c)(1),
(2), (4) Date: Jan. 7, 2014

(87) PCT Pub. No.: WO2013/007404
PCT Pub. Date: Jan. 17, 2013

(65) Prior Publication Data
US 2014/0130928 A1   May 15, 2014

(30) Foreign Application Priority Data

Jul. 8, 2011   (FR) ...................................... 11 56234
Nov. 18, 2011   (FR) ...................................... 11 60527

(51) Int. Cl.
| | |
|---|---|
| *F16L 55/00* | (2006.01) |
| *B65D 59/06* | (2006.01) |
| *E21B 17/00* | (2006.01) |
| *F16L 57/00* | (2006.01) |

(52) U.S. Cl.
CPC ................. *F16L 55/00* (2013.01); *B65D 59/06* (2013.01); *E21B 17/006* (2013.01); *F16L 57/005* (2013.01); *F16L 2201/60* (2013.01)

USPC .......................................... 138/96 T; 138/104

(58) Field of Classification Search
CPC .............................. G06F 11/006; E21B 17/006
USPC ........................................ 138/96 T, 96 R, 104
See application file for complete search history.

(56) References Cited

U.S. PATENT DOCUMENTS

| | | | |
|---|---|---|---|
| 5,303,743 A | 4/1994 | Vincent | |
| 7,159,654 B2 * | 1/2007 | Ellison et al. | 166/250.01 |
| 7,606,682 B2 * | 10/2009 | Denny et al. | 702/188 |
| 7,652,576 B1 | 1/2010 | Crossno et al. | |
| 7,946,356 B2 * | 5/2011 | Koederitz et al. | 175/40 |
| 2005/0230109 A1 * | 10/2005 | Kammann et al. | 166/255.1 |
| 2007/0039210 A1 * | 2/2007 | Clark et al. | 36/113 |
| 2009/0188675 A1 | 7/2009 | Bloom et al. | |

FOREIGN PATENT DOCUMENTS

| | | |
|---|---|---|
| JP | 2008 070922 A | 3/2008 |
| JP | 2008 250714 A | 10/2008 |

* cited by examiner

*Primary Examiner* — Patrick F Brinson
(74) *Attorney, Agent, or Firm* — Blakely Sokoloff Taylor & Zafman

(57) ABSTRACT

The invention relates to an assembly including: an petroleum extraction pipe (2) having a thread at the ends thereof, and two protectors (1) for the thread of said extraction pipe (2), each of the protectors including a tubular body and a thread that is complementary to said thread of the extraction pipe, wherein said assembly is characterized in that it includes at least one module (3) for containing information relating to at least one property of an extraction pipe (2), said module being removably connected to said extraction pipe (2).

11 Claims, 4 Drawing Sheets

EXTRACTION ASSEMBLY INCLUDING AN INFORMATION MODULE

GENERAL TECHNICAL FIELD

The present invention relates to the field of pipes for extracting petroleum and gas.

STATE OF THE ART

Petroleum and gas extraction pipes are used for drilling wells and for extraction, in order to attain great depths.

These pipes have threads at each of their ends allow them to be connected together, either directly or by means of intermediate elements.

The threaded ends of the pipes are called male ends, while the tapped ends of the pipes are called female ends. Throughout the present patent application, we will write generally of threaded ends of an extraction pipe, which interchangeably designates the threaded or tapped ends of the extraction pipes.

In conformity with the practice of one skilled in the art, a protector fitting the male end of a pipe is called a male (or pin) protector, and a protector fitting a female end of a pipe is called a female (or box) protector.

Another problem with extraction pipes commonly used for petroleum and gas drilling and extraction operations is their logistical management and the determination of their properties or of information concerning them.

Indeed, extraction pipes are typically packaged in the form of lots, which complicates handling and carrying out measurements on a single pipe between its manufacture and its use on site.

Several studies have attempted to modify extraction pipes so as to implant marking or tracing means on them. However these studies, carried out over the last 5 to 10 years, have not given the desire result in that they resulted systematically in deterioration of the mechanical properties of the pipe, which is prohibitive.

The present invention aims to propose a solution to these problems of logistical management and of identification of extraction pipes that has no impact on the mechanical properties of said extraction pipes or of the equipment associated with them.

PRESENTATION OF THE INVENTION

To this end, the invention proposes an assembly consisting of a petroleum extraction pipe equipped with a thread at its ends, and two thread protectors for said extraction pipe, each of said protectors including a tubular body and a thread complementary to said thread of the extraction pipe, said assembly being characterized in that it includes at least one module designed to contain information relating to at least one characteristic of the extraction pipe, said module being removably connected to said extraction pipe.

As a variant, said assembly exhibits one or more of the following features, taken independently or in combination:

said module is an RFID medium mounted on said protector, including an RFID identifier corresponding to said characteristic of the extraction pipe;

said assembly also includes a geographic location means;

said protectors are formed by injection of thermoplastic polycarbonate or polyurethane;

said assembly also includes a cap connected to each of said protectors, the module being designed to be placed on said cap of the protector; it then typically includes a flexible strap connected to the pipe by means of a split collar, the module being placed on said strap, said strap and the protectors being equipped with complementary attachment means.

The invention also relates to a system including:

an extraction pipe having a male and a female end, two extraction pipe protectors, male and female respectively, mounted on the male and female ends of the extraction pipe, two RFID medium including an RFID identifier corresponding to at least one characteristic of said extraction pipe, said RFID identifiers being associated with one another in an external database and also being associated with characteristics of said extraction pipe on which said protectors are mounted;

communication means designed to read the RFID identifier, and to display it.

As a variant, said RFID identifier corresponds to characteristics of the extraction pipe in the following list: effective length of the pipe, inner or outer diameter of the pipe, unique identifier of the pipe.

The invention also relates to a method for managing an extraction pipe provided with a protector associated with a module designed to contain information relating to said pipe, consisting of:

reading the information of said module, processing the information by comparing it with information contained in an existing database, selecting a value in said database corresponding to a user request, displaying said value.

As a variant, said method includes a prior step of associating at least one module including a unique identifier and an extraction pipe, said identifier of the module and of information relating to the protector being compiled in a database.

The invention also relates to an assembly including a petroleum extraction pipe provided with a thread at its ends, and two thread protectors for said extraction pipe, each of said protectors having a tubular body, a thread complementary to the thread of the extraction pipe and an free end, said assembly being characterized in that it includes at least one module designed to contain information relating to at least one characteristic of the extraction pipe, said module being an RFID medium including an RFID identifier corresponding to said characteristic of the extraction pipe and removably connected to said extraction pipe.

As a variant, said module is attached to a harness including a belt designed to be attached around said extraction pipe and positioning means for said module designed to removably position said module to a free end of a protector.

Said positioning means are then typically two straps extending from the belt, one of said straps serving as a support for said module, said straps each having complementary gripping means designed to allow said straps to be attached together to the free end of the protector.

Said belt then typically has an elastomeric coating, for example of neoprene or cellular neoprene, on its inner face, designed to be in contact with said extraction pipe.

According to another variant, the removable connection between said extraction pipe and the module includes a closure element designed to serve as a telltale showing breakage of the connection between the module and the extraction pipe.

According to yet another variant, said module is associated with a geographic location means.

According to still another variant, said protectors are formed by injection of thermoplastic polycarbonate or polyurethane.

According to yet another variant, said assembly also includes a cap connected to each of said protectors, the module being designed to be positioned on said cap of the protector.

The invention also relates to a system including:
an extraction pipe having a male end and a female end,
two extraction pipe protectors, male and female respectively, mounted on the male and female ands of the extraction pipe,
two RFID medium including an RFID identifier corresponding to at least one characteristic of the extraction pipe, said RFID identifiers being associated with one another in an external database and also being associated with characteristics of said extraction pipe whereon said protectors are mounted;
communication means positioned near a wellbore, designed to read the RFID identifier of an extraction pipe intended for use in said wellbore, and to sequentially display the RFID identifiers of the extraction pipes used in said wellbore as well as a selection of characteristics of said extraction pipes.

PRESENTATION OF FIGURES

Other features, objects and advantages of the invention will appear from the description that follows, which is purely illustrative and not limiting, and which must be read with reference to the appended drawings, wherein.

DETAILED DESCRIPTION

Figure 1:
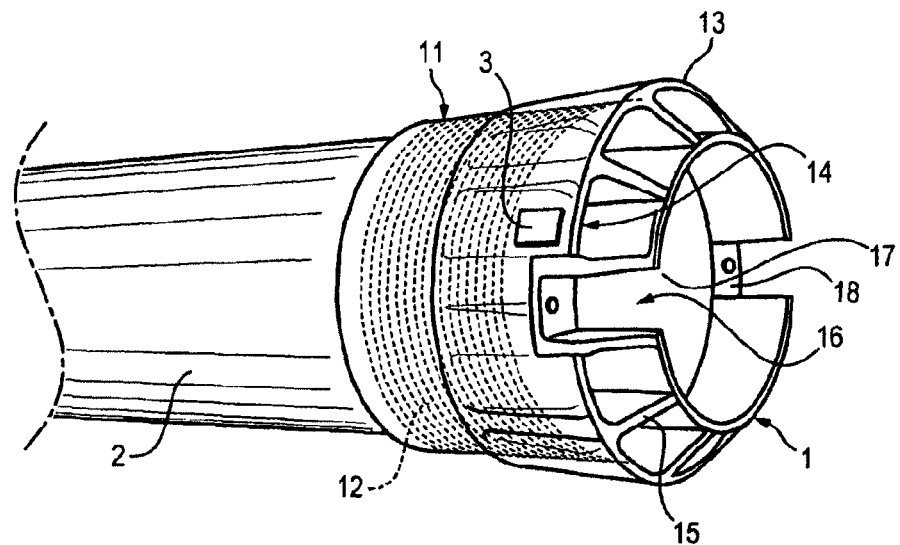
FIGS. 1, 2 and 3 show two variants of an assembly including an extraction pipe, a thread protector and a module according to one aspect of the invention.

FIG. 1 shows a thread protector 1 of an extraction pipe 2 associated with a module 3 allowing storage of information.

The protector 1 as shown is advantageously made by injection of plastic and/or composite material (such as metal-plastic protectors), which can be transparent or opaque; typically thermoplastic polycarbonate or polyurethane.

As a variant, the protector 1 is made of polypropylene or acrylonitrile butadiene styrene, and can be reinforced with metal, metal-plastic or composite parts.

The protector 1 as shown includes a tubular body provided with a outer or inner thread 12 complementary to the outer or inner thread of an extraction pipe 2, and an outer ring 13 defining an enlargement of the outer diameter of the protector 1 so as to cushion the possible shocks to which the pipe 2 might be subjected. Several recesses 14 are defined between the tubular body 11 and the outer ring 13, said recesses being typically delimited by radial ribs 15.

The protector 1 as shown is associated with a cap 16 located at the free end of the protector.

The cap 16 includes a central plate 17 and feet 18, said feet being designed to cooperate with locking means such as pins arranged on the body of the protector 1, and thus to hold the cap 16 in position on the protector 1.

The central plate 17 can take several forms. In the embodiment shown, it is a disk which allows complete closure of the opening located at the free end of the protector 1, thus guaranteeing its fluid-tightness. As a variant, the central plate 17 may not completely shut the opening at said free end of the protector 1; it may for example be a strip running along a diameter of the protector 1.

FIG. 1 shows a variant in which the module 3 is fixed on the protector 1. As a variant, the module 3 can be fixed on the cap 16, or even on the pipe 2 as will be seen later in FIG. 2. The attachment of the module 3 can be accomplished by means of any suitable technique, so as to ensure that it is held in position without damaging the module 3, the protector 1, the pipe 2 or the cap 16.

In particular, the following embodiments can be mentioned:
the protector 1 defines an internal recess 14 wherein the module 3 is positioned; the internal recess(es) 14 of the protectors can then be filled with resin, which makes it possible in particular to ensure that the module 3 is held in said recess 14 of the protector 1;
the module 3 is adhesive bonded or welded onto said protector 1 or cap 16;
the module 3 is fixed on said protector 1 or cap 16 by means of fasteners (such as rivets or a screw-bolt set preferably made of plastic to limit any kind of corrosion);
the protector 1 or the cap 16 can have an excrescence in the form of a stem on their surface. The module 3 in the form of a ring (or the form whereof includes a ring) can be positioned around the excrescence. The upper end of the excrescence is then heated to deform it, and thus to obtain a diameter greater than the diameter of the module 3 (or of the ring of the module 3) so as to lock the module 3;
the module 3 can be clipped to the protector 1 and the cap 16, mounting of the module 3 being accomplished by force;
the module 3 can be connected by a plastic, elastomeric, metal or cordage ring to the protector 1 or cap 16;
the module can be sewn, particularly onto the strap 31 which will be described later with reference to FIGS. 2 and 3;
the module 3 can be welded onto said protector 1 or cap 16 (such as by ultrasonic, friction or mirror welds);
the protector 1 or the cap 16 can be overmolded about said module 3, the latter being, if applicable, advantageously positioned in an envelope protecting it during molding so as to avoid deterioration of the module.

As a variant, the protector 1 is made closed, that is with a wall made directly by injection in the place of the cap 16 shown in FIG. 1. Depending on the desired use, this wall can be retained or removed by machining so as to obtain an "open" protector 1 as shown in FIGS. 1 through 3, with which a cap 16 is typically associated.

In the case where this wall is retained, the module can be applied directly to this wall, which is advantageous in terms of manufacturing cost, and makes the module 3 inseparable from the protector 1.

Figure 2:
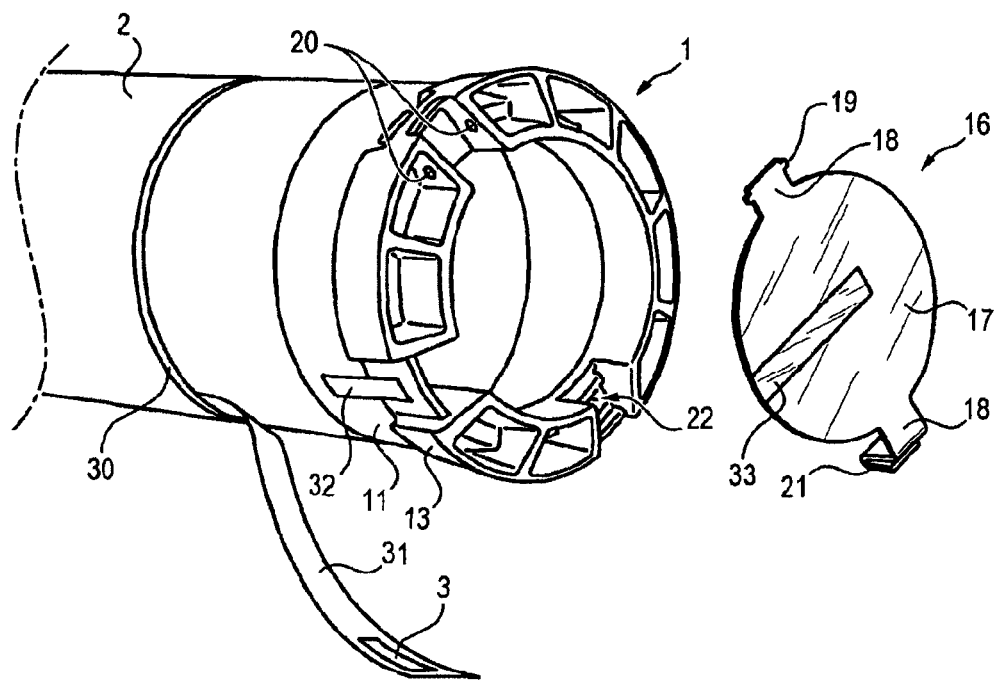
Figure 3:
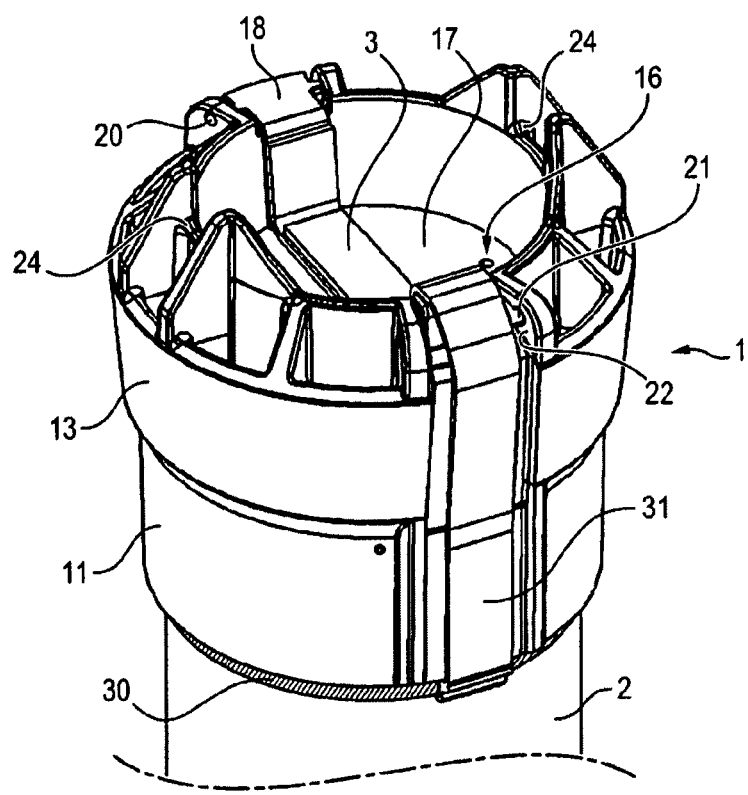

FIGS. 2 and 3 show two variants, wherein the protect 1 is provided with a cap 16 mounted pivotably by means of a hinge.

FIG. 2 shows an exploded view of a first variant, while FIG. 3 shows an assembled view of a second variant.

Here the cap 16 consists of a central plate 17, provided with two feet 18 on either side of this central plate 17, a first of these feet being provided with protrusions 19 designed to cooperate with bores 20 made in the protector 1, here in its outer ring 13, so as to form a hinge, the second of these feet forming a retention means 21 "clippable" to the complementary means 22 of the protector 1, which can be disengaged by the user so as to allow pivoting of the cap 16 about said hinge.

In addition, the pipe 2 is also equipped with a collar 30 mounted tightly around said pipe 2, to which is attached a strap 31 having a free end, in proximity whereof is attached the module 3. This collar 30 is advantageously made of a material that can be cut by the user, of plastic for example, so as to offer sufficient resistance to guarantee that the collar 30 will be held on the pipe 2 in the event of accidental shocks or forces, while remaining detachable by the user.

All or part of the collar 31 can be protected from impacts by a provision of the protector 1, typically an excrescence to protect the attachment head(s) of the collar 31. Thus, before the insertion of the pipe 2 into the wellbore, the user can cut the collar 30 so as to detach it from the pipe 2.

This strip 31 is typically a self-gripping strap, for example of the hook and pile type, for example the self-gripping straps sold under the name Velcro™, or any other suitable means, for example removable mushroom-shaped fasteners that clip together (commonly sold under the name "Dual Lock™," by complementary magnetic strips or a system including a trapezoidal strap 31 clipping by force into a dovetail shape provided on the protector. It is also possible to use a combination of the elements sold under the names Velcro™ and Dual Lock™, for example by associating the pile portion or the hook portion of a Velcro™ with a Dual Lock™ gripping strip. The protector 1 and the cap are then typically provided with complementary fastening means, respectively 32 and 33, allowing the user to attach the strap 31 to the protector 1 and to the cap 16 when they are positioned at the end of the pipe 2.

The strap 31 is advantageously sized so that, when it is attached to the protector 1 and to the cap 16, the module 3 is positioned substantially in the center of the central plate 17 of the cap 16.

In the embodiment shown in FIG. 2, the protector 1 includes a slit provided in its outer ring 13, so as to allow passage of the strap 31 so that it is protected by the protector 1 from outside shocks or forces. The protector 1 can also include ribs, for example on the body 11 of the protector 1, so as to protect the strap 31.

In the variant shown in FIG. 3, this passage for the strap 31 corresponds to the portion of the outer ring 13 including the means 22 complementary to the fastening means 21 of the cap 16. This variant also makes it possible to hold the cap 16 closed as long as the strap 31 is in place.

In this variant, the protector 1 also includes notches 24 projecting from the free end of the protector 1, these notches 24 being typically designed to allow the user to insert a tool into them for tightening or unscrewing the protector 1 from the pipe 2, and also accomplish additional protection against longitudinal impacts.

Figure 4:
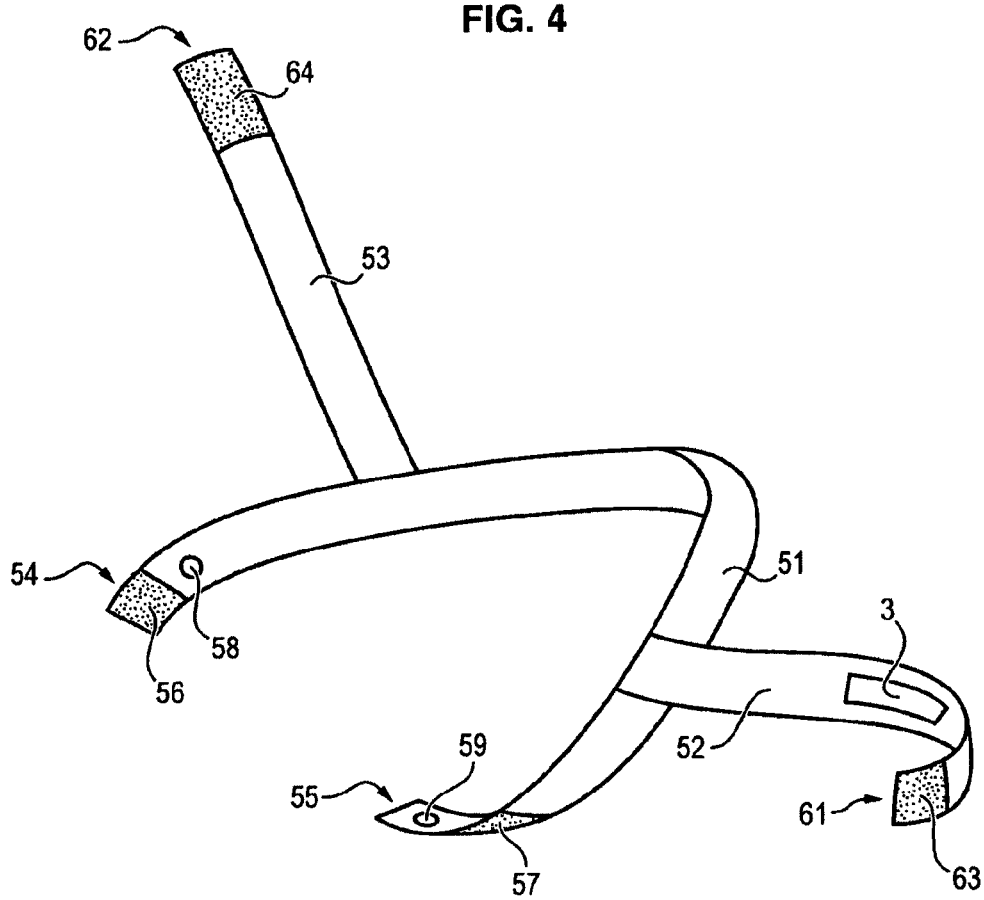
FIGS. 4 and 5 show another variant of an assembly including an extraction pipe, a thread protector and a module according to one aspect of the invention.
Figure 5:
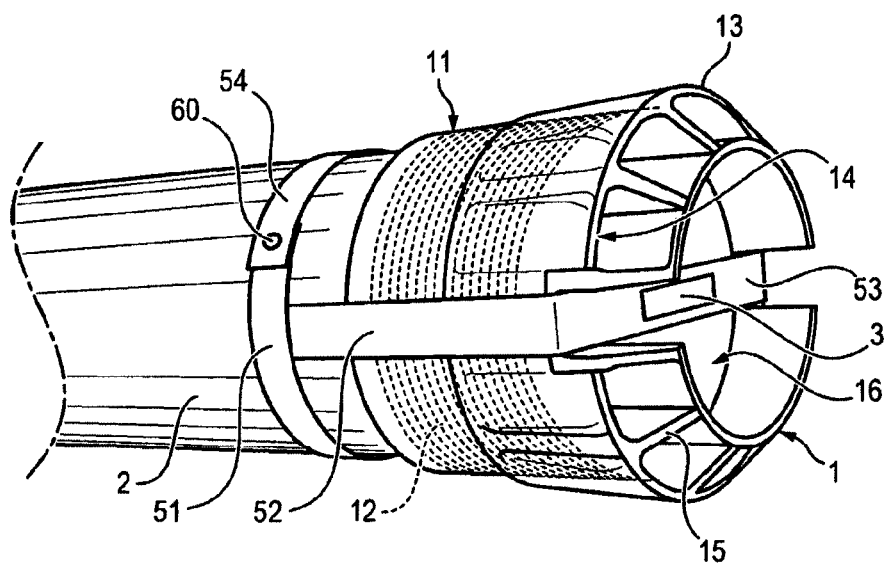

FIGS. 4 and 5 show another embodiment wherein the module 3 is associated with a harness allowing it to be fastened to the protector 2 and to be positioned on the free end of the protector 2 without requiring specific means on the protector 1 or on the pipe 2.

More precisely, the harness 5 includes a belt 51 from which two straps, respectively 52 and 53, extend. The harness 5 is typically made of polyester and/or of Neoprene.

The belt 51 has two free ends 54 and 55 having complementary gripping means 56 and 57, typically, self-gripping elements such as those described previously. These complementary gripping means 56 and are typically positioned on two opposite faces of the belt 51, such that when superposing the two free ends 54 and 55 of the belt 51 said complementary gripping means 56 and 57 can engage.

The free ends 54 and 55 each also advantageously include an opening, respectively 58 and 59, designed to align when the two free ends 54 and 55 of the belt are superposed and the complementary gripping means 56 and are engaged, so as to insert into them a closure element 60 of the belt 51; typically a rivet as shown in FIG. 5.

The belt 51 of the harness 5 is sized so that the closure element 60 holds it tightly on a protector 2 having a given diameter, such that removing the belt 51 from the protector 2 requires the removal of the closure element 60.

The two straps 52 and 53 extend from the belt 51, so as to be diametrically opposite when the belt is closed around a pipe 2. The length of the portion of the belt 51 separating the two straps 52 and 53 is thus advantageously equal to the outer perimeter of the pipe 2 onto which the harness 5 is intended to be attached. Each of these straps thus has a free end, respectively 61 and 62.

The two straps 52 and 53 as shown can be defined as a support strap 52 and a fastening strap 53.

The support strap 52 includes a module 3 as shown earlier, typically positioned in proximity of the free end 61 of the support strap 52.

The free ends 61 and 62 of the straps 52 and 53 are advantageously equipped with complementary gripping means 63 and 64, typically self-gripping elements such as those described previously. These complementary gripping means 63 and 64 are each typically positioned on a distinct face, such that by superposing the two free ends 63 and 64 of the straps 52 and 53 said complementary gripping means 63 and 64 can engage. The straps 52 and 53 and the module 3 are advantageously sized and positioned such that when the harness is attached to a pipe 2 and the two straps are fastened using their complementary gripping means 63 and 64, the module 3 is positioned at the free end of the protector, typically on its cap 16.

Referring to FIG. 5, in which is shown a pipe 2 at the end whereof is placed a protector 1 as described previously, the pipe 2 is wrapped by means of the belt 51 of the harness 5, then the two straps 52 and 53 are fastened at the protector 2, on its free end; on its cap 16 if any. It is then possible to lock the positioning of the harness 5 on the pipe 2 using a closure element 60 as described previously.

This particular embodiment thus makes it possible to avail of a module 3, a pipe assembly 2 and a protector 1 having no dedicated gripping means, and without requiring that the protector 1 be made of a particular material, or that the attachment surfaces of the module 3 be specially prepared or cleaned to allow its attachment.

In addition, the closure element 60 makes it possible to ensure that the module 3 remains firmly attached to the selected pipe 2; indeed, separating the module 3 from the pipe 2 requires the destruction of the harness 5, of the module 3 or of the closure element 60. The user can thus clearly identify a module 3 which has been separated from the pipe 2 to which it was initially fastened, the closure element 60 serving as a seal or breakage telltale.

Moreover, the straps 52 and 53 being advantageously capable of being assembled and separated by means of their complementary gripping means 63 and 64, the user can always carry out verification and checking operations on the pipe 2 such as Drift operation. Indeed, he need only separate the two straps 52 and 53 which remain firmly attached to the pipe 2 via the belt 51, remove the cap 16, if any, of the protector or the entire protector 1, carry out his checking operations, then replace the cap 16 or the protector 1 and finally re-fasten the two straps 52 and 53 together.

Moreover, the use of a belt 51 including an internal elastomeric coating, such as neoprene or cellular neoprene, makes it possible to provide a suction-cup effect on the perimeter of the pipe 2, and thus to reinforce its capacity to be held in position around the pipe 2.

Finally, by ensuring the positioning of the module 3 at the free end of the protector 1, that is at one end of the pipe 2, the reading of the information contained in the module 3 is considerably facilitated compared with a module fastened to the periphery of the pipe 2 or of the protector 1.

In these embodiments, the module 3 is connected with the pipe 1, which makes it possible to avoid any risk of accidental separation between the module 3 and the associated pipe 2, for example when withdrawing protectors 1 for a checking or cleaning operation, without deterioration of the pipe 2.

More generally, whether the embodiment shown in FIG. 1, in FIG. 2, in FIG. 3, or in FIGS. 4 and 5 is considered, the module 3 is removably connected to the pipe 2, whether through the protector 1 or its cap 16, or attachment means such as a collar 30.

Positioning of the module 3 on the cap 16 has several advantages. Indeed, the transmission of the module 3 can be inhibited due to the metallic nature of the pipe 2. Thus, by positioning the module 3 on the cap 16 of the protector 1, the module 3 is kept as far away as possible from the pipe 2 and the interference that the latter could cause in the emissions of the module are then reduced.

In the case where the module 3 is positioned on the cap 16 of the protector 1, said cap 16 is then advantageously connected to the body of the protector 1 such that it cannot be dissociated from it. Such a connection can be example be accomplished by means of a light chain, a cable, a cord or even a hinged connection such as in the embodiment of FIG. 2.

The module 3 is advantageously arranged so as not be exposed to external shocks or forces which might damage it, for example in reinforcements or recesses.

The module 3 is typically an RFID module containing an RFID tag, advantageously of the UHF (ultra-high frequency) type, that is RFID modules using frequencies comprised within the range 860 MHz-960 MHz. The module 3 can also be associated with a GPS type positioning module or a GPRS module, such modules being well known in the state of the art and allowing the pipe associated with the module to be located, which makes possible for example real-time monitoring of pipe orders or deliveries, or even locating stock.

Such a GPS or GPRS positioning module is typically associated with a "bundle" of pipes, that is to say a lot of pipes connected together with slings and yokes for packaging and transporting them. The positioning module is advantageously positioned on a sling or a yoke of the bundle so as to be well separated so as not to interfere with the emission of the positioning module.

It is thus possible to monitor geographically such a lot by its packaging up to the use site thanks to the positioning module, which the individual monitoring of the various pipes on the use site is then accomplished by the module 3 which is for example of the RFID type.

By thus associating a positioning module with a "bundle" of pipes, the number of positioning modules needed is reduced, such modules being more costly than the RFID type modules.

The geographic positioning module and the different modules of the pipes in the pipe bundle in question are advantageously associated, for example in a database, when they are packaged.

It is noted that RFID (Radio Frequency Identification) technology, on which the NFC (Near-Field Communication) technology is based, is well known in the state of the art and will not be described here in detail. RFID technology employs modules commonly called "markers" which can be glued to or incorporated into objects, including an antenna associated with an electronic chip which allows them to receive and to respond to radio queries emitted by a transmitter-receiver.

According to a particular embodiment, ultra-high frequency technology, that is to say typically 860 MHz to 960 MHz, known under the designation "passive UHF" is used, wherein the module 3 does not include a battery, or an active ultra-high frequency module equipped with a battery.

The module includes for example information coded in 512 bits. The following encoding can typically be used:
- a unique identifier encoded in 30 bits, which makes it possible to encode unique identifiers for 2 to 4 million pipes per year for a period of 50 years;
- the length of the pipe: in meters, with a precision to the nearest centimeter; for pipe lengths ranging from 0 to 15 m=1,500 values in 2,048; that is 11 bits;
- pipe diameters: typically 10 diameter values in 32 values, or 5 bits;
- thread type: 10 different thread types encoded in 32 values, or 5 bits;
- pipe thickness: 50 thickness values encoded in 64 values, or 6 bits;
- the name or an abbreviated identifier of the pipe manufacturer: typically encoded in 6 bits;
- the name or an abbreviated identifier of the customer (the recipient of the pipe for example): typically encoded in 8 bits;
- for a total of 71 bits occupied by this information.

The remaining bits of the 512 bits of memory in the module are used to store the most recent events experienced by the pipe (place, date, reader, action), each of these events being typically encoded in a hundred bits or so. It is thus typically possible to record on the module between 3 and 5 of the latest events in the life of the pipe.

According to one particular embodiment, the protector 1 and/or the pipe 2 includes a second means of identification, typically in the form of a serial number or a barcode, such as second means being typically used only in the event of failure of the module 3.

It will be noted that FIGS. 1, 2, 3, 4 and 5 have a single end of the pipe 1 equipped with a protector 2. It will be easily understood that a similar arrangement is found at the other end of the pipe 2.

For example, in the case of an extraction pipe 2 including a male end and a female end, the two ends are respectively equipped with a male protector and a female protector, each of these protectors 1 then be advantageously provided with a module 3.

Thus the invention makes it possible to have available means allowing rapid and automated identification of the extraction pipes, without having a negative impact on the characteristics of the extraction pipes themselves. Indeed, installation of the module 3 containing information relating to the pipe 2 on the protector(s) 1 or the cap(s) 16 of the protector (s) associated with the pipe 2 makes it possible not to carry out any structural modification of the pipe 2 itself, unlike prior approaches of a person skilled in the art who would naturally try to implant some means of identifying the pipe directly on the pipe.

Figure 6:
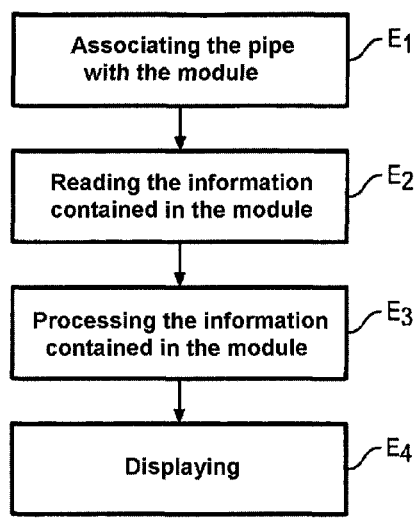
FIG. 6 shows a schematic representation of a method according to a second aspect of the invention.

FIG. 6 illustrates schematically a method for monitoring an extraction pipe associated with a protector and a module as defined previously.

Step E1 of Associating the Pipe with the Module

This step E1 is located typically following the manufacture of the pipe, during its packaging.

At that time one or more modules are associated as described previously, for example one module at each end of the pipe. Two variants are distinguished, depending on whether the module is attached to the pipe itself of to the protector.

In the case where the module is associated with the protector, which corresponds for example to the embodiment shown in FIG. 1, thread protectors are associated with said pipe, typically a protector at each of its ends, prior to packaging it into a lot and transporting or storing it.

In the case where the module is associated with the pipe, which corresponds for example to the embodiment shown in FIGS. 2 through 5, one or more modules are associated with the pipe, for example by attaching them by means of plastic collars which are clamped onto the body of the pipe near its ends or by means of harnesses such as those previously shown.

During this association between the extraction pipe and the module(s), one or more information items relating to the pipe are applied to the module(s).

Several embodiments are possible for accomplishing this step E1.

The pipe, for example, can be tagged with a unique identifier, typically defined by its manufacturer. The module(s) then also have this identifier applied to them.

As a variant, the information contained in the module advantageously correspond to one or more of the following characteristics of the associated pipe:
- the length of the pipe,
- the inner and outer diameter of the pipe,
- the type of threading or tapping of the pipe,
- the thickness of the pipe,
- the geometric properties of the pipe thread.
- the identification of a customer
- traceability of the history of the pipe (referring in particular to various places, dates and actions)
- a type of coating present on the pipe thread
- an order number
- a unique pipe number As a variant, the module(s) are already provided with a unique identifier; the pipe identifier or its properties (for example its manufacturer, its dimensions or any other properties allowing it to be characterized) are then connected to that of the module(s) associated with it in a database. The use of unique identifiers will make it possible to identify unequivocally the protectors by means of their identifier.

In the case where the module includes a unique identifier of the pipe or of the protector, this identifier is then associated with a database including the identifiers of the different pipes and protectors equipped with such modules, as wells as the information associated with said pipes or modules.

In particular, information items that can be mentioned are:
- the geometric properties of the pipe,
- reports of tests made on the pipe,
- the lot from which the pipe is drawn, and its place of manufacture.
- the history of actions concerning the pipe and/or the module.

The information relating to a characteristic of the extraction pipe being written in the module during packaging of the pipe and hence during placement of the protectors at the threaded ends of the pipe, it is ensured that the information contained in the module do in fact correspond to the pipe on which the module is placed.

Step E2 of Reading the Information Contained in the Module.

The information contained in the module is red by suitable communication means.

This reading of the information contained in the module can occur in several situations, among which can be mentioned, without limitation:
- checking of stock and inventories,
- monitoring orders or lots of extraction pipes,
- prior to use of the pipes on a drilling or extraction site, during withdrawal of the thread protectors of the pipe so as to identify and tag the pipes used on site.

Reading of the information contained in the module can be accomplished on request or automatically during passage of the protector in proximity to a given location.

In the event of failure of the module 3, the information that it contains cannot typically be read, or is only partially read. In this case, if the protector 1 and/or the pipe 2 is equipped with a second means of identification such as a serial number or a barcode, the operator can identify the pipe and/or the protector by means of this second means of identification.

Step E3 of Processing the Information Contained in the Module.

Following reading of the information contained in the module, this information is processed by the communication means, which are advantageously designed to carry out all or part of the following operations:
- segmenting the information read in order to extract from it only specific information desired by the user,
- comparing the information read with information stored in a database.

In the embodiments where the information read is compared with data stored in a database, the communication means are typically designed to extract the data from said database corresponding to a query by the user.

This step E3 is typically followed by a step E4 consisting of displaying the desired information.

Figure 7:
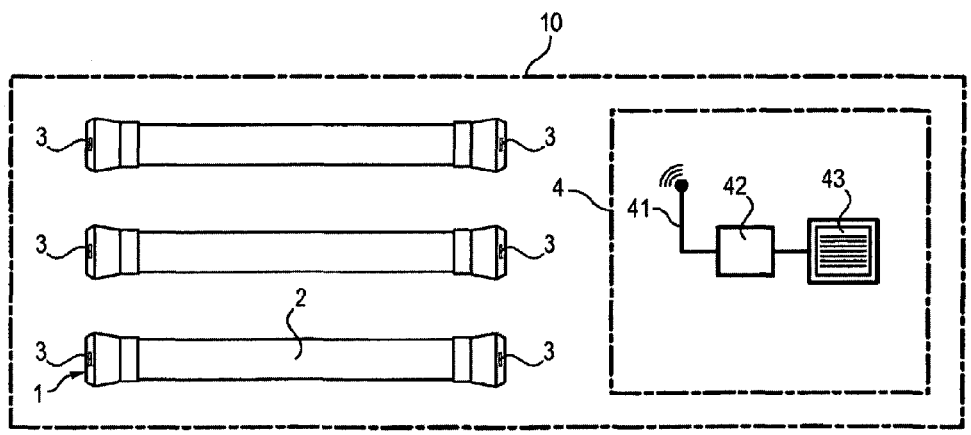
FIG. 7 shows a schematic view of a system according to a third aspect of the invention.

FIG. 7 shows an example of a system 10 designed to implement the method as previously defined.

The system 10 includes several pipes 2, each of said pipes being provided with protectors 1 and modules 3 such as those presented earlier in FIGS. 1 through 5, as well as communication means 4 making it possible to read, process and display the information contained in the module 3.

The communication means 4 typically include one or more antennas 41 designed to detect the modules 3 and to read the information which they contained at a defined distance.

This distance and therefore the nature of the antenna 41 used is typically selected according to the location and function of the antenna 41.

By way of an example, for an antenna 41 positioned in a storage area, it is advantageous to select an antenna 41 which is capable of detecting modules 3 located over the entire area of the storage area.

For an antenna 41 positioned in a specific zone such as the zone for preparing the pipes 2 for descent into the wellbore or in a storage zone wherein the next pipe 2 intended for descent into the wellbore is stored, it is advantageous to select a short-range antenna 41 so as to ensure that only the modules 3 of the pipes 2 which are brought into such a zone are detected and read.

Short-distance antennas 41 can also be positioned on tools used for unscrewing the protectors 1, which thus brings them into proximity to the modules 3 connected with the pipes, to the protectors or to the caps.

It is also possible to position antennas 41 in protector bins wherein the protectors 1 are stored following use of the pipe on which they were fastened in the case of embodiment shown in FIG. 1, or in a container including the different associated straps, harnesses and modules following their removal from the pipe in the case of the embodiment shown in FIGS. 2 through 5. Such an antenna makes it possible for example to thus confirm which pipes 2 have actually been lowered into the wellbore or soon will be.

The detection and reading of information contained by the modules 3 is then accomplished directly during unscrewing of the protectors 1 from the pipe 2 in order to ensure that only the modules 3 associated with the pipe 2 actually being used are identified and read.

The means of communication 4 typically include a processing means 42 such as a processor designed to process the information which is in the module, as well as display means 43 allowing the user to view the desired information.

Implementation Examples

A first example of implementation of an aspect of the invention relates to operations for checking the extraction pipes.

A user may wish to check the characteristics of the extraction pipes which are stored as a lot prior to their use or to their forwarding to a use site.

The user is then typically equipped with a portable device for reading the information contained in the modules of the different protectors associated with the pipes in question, which can typically be associated with a device such as a portable computer, a tablet or a PDA.

The information read on the modules of the different pipes is then compared with information entered into a database which typically includes the following information:
- a pipe reference,
- references of the protectors associated with said pipe,
- characteristics of the pipe; for example its inner diameter, its outer diameter, its effective length, its weight, its manufacturer, the properties of the threads at its ends,
- reports concerning the pipe or the associated protectors; for example reports of check performed on the pipe (typically operations checking the interior of the pipe, commonly called "drift"),
- order numbers associated with the pipe or the lot of pipes, thus making it possible to determine the destination of the pipe or lot of pipes.

The user, who wishes to check the characteristics of pipes in a storage area, or more generally perform an inventory, can pass near pipes equipped with modules with a portable reader which reads all the identifiers contained in the modules, then connects to an existing database so as to obtain information corresponding to the identified pipes.

In the event of double reading of a pipe, for example by reading the same identifier twice or by reading two modules of one and the same pipe in the case where the pipe includes a module positioned at each of its ends, this conflict is managed at the database which connects these multiple measurements of the same pipe.

The user can proceed with checks of the extraction pipes, for example checks of their dimensions, by means of measuring tools such as a laser rangefinder, and then cross-check these measurements with the information contained in the modules of the different pipes.

A second example of implementation of an aspect of the invention relates to the use of the pipes on site, for example in the case of a wellbore.

The pipes are forwarded to the site by lots, then brought to the wellbore where they are assembled so as to be placed end to end, then lowered into a wellbore.

Means of communication such as antennas are then advantageously positioned in an area for preparing and assembling pipes prior to their descent into the wellbore.

The communication means then detect automatically, or as a result of a command by the user, the protectors that are sent into this preparation area, and therefore identify the pipes which are sent there and will therefore be lowered into the wellbore.

The user can thus prepare a list of the different pipes that have been lowered into the wellbore, in chronological order. He can thus gain access to different types of information, for example identifying the position of pipes in the wellbore by applying the lengths of the different pipes, knowing the total length of the pipes that have been lowered into the wellbore.

Table 1 below illustrates an example of such an implementation so as to obtain a table usable directly by the user.

In the example illustrated, the user can thus view the different pipes having been inserted into the wellbores and those which are waiting to be, and has available information regarding their order of insertion, their individual and cumulative lengths, and the depth at which they are located.

Such a table is advantageously updated in real time, as each of the different communication means detect the modules in the preparation area prior to lowering. The user can then for example validate the different pipes as each of them is actually lowered into the well. Such a table is advantageously shared via communication means such as the Internet, allowing any authorized person to consult the progress of the well, advantageously in real time.

TABLE 1

| Order | Pipe | Total | Length | Depth | |
|---|---|---|---|---|---|
| 5 | REF5 | | 12.01 m | | Stock |
| 4 | REF4 | | 11.14 m | | |
| 3 | REF3 | 30.62 m | 10.12 m | 1031.53 m | Well |
| 2 | REF2 | 20.50 m | 11.00 m | 1041.65 m | |
| 1 | REF1 | 9.50 m | 9.50 m | 1052.65 m | |

The information thus displayed typically reproduce the following data: pipe number, type of thread, pipe diameter, pipe length, the sum of the lengths of the pipes lowered into the well.

For this type of application, it is advantageous to only read the information contained in the module, without including consulting or connection with a database, so that the system is not affected by a network cutoff, which is particularly advantageous considering the sites where extraction pipes are used.

The invention exhibits numerous advantages compared to conventional devices and methods.

In the first place, the invention proposes to accomplish monitoring and tracing of extraction pipes, which makes it possible to rapidly and easily gain access to characteristics and information concerning an extraction pipe. The invention also makes it possible to ensure against the "accidental" dissociation of the pipe and the module containing information concerning it, while still allowing its removal prior to lowering into the well.

The user can thus gain access to this information starting from the information contained in the module. It is thus no longer necessary to carry out measurement operations on site, the geometric information concerning the extraction pipe in question being quickly retrievable thanks to the information contained in the module.

The number of manipulations carried out on the pipe and the protectors is therefore considerably reduced.

Stock and order monitoring are simplified, and can be updated in real time. Counting operations are also simplified.

Moreover, in the event of complication or of an incident connected with the use of a pipe, the invention allows traceability of the different quality checks of the pipe in question.

For example if, during the drilling of a well, an incident is detected at a given depth, the information concerning the effective lengths of the different pipes lowered sequentially into the well make it possible to determine which pipe is located at the depth of the incident. The user can then gain access to the different information concerning the pipe; for example the reports of the different tests performed on the pipes, such as the "drifts."

The invention claimed is:

1. An assembly including:
   a petroleum extraction pipe (2) equipped with a thread at its ends, and
   at least one module (3) which contains information relating to at least one characteristic of said extraction pipe (2), said module being an RFID module including an RFID identifier corresponding to said characteristic of the extraction pipe (2) and removeably fastened to said extraction pipe (2),
   wherein said module (3) is fastened onto a harness (5) including a belt (51) for fastening around said extraction pipe (2), and means (31, 52, 53) for positioning said module (3) for removeably positioning said module (3) at a free end of a protector (1).

2. The assembly according to claim 1, wherein said positioning means are two straps (52, 53) extending from the belt (51), one of said straps (52) serving as a support for said module (3), said straps (52, 53) each having complementary gripping means (63, 64) designed to allow said straps to be fastened together at the free end of the protector 1.

3. The assembly according to claim 2, wherein said belt (51) includes an elastomeric coating on its inner face designed to be in contact with said extraction pipe (2).

4. The assembly according to claim 3, wherein said elastomeric coating is of the neoprene or cellular neoprene type.

5. A system including:
   the assembly according to claim 1, wherein the extraction pipe (2) has a male end and a female end,
   a second RFID module (3) including a second RFID identifier corresponding to at least one characteristic of said extraction pipe, said first and second RFID identifiers being associated with one another in an external database, and also being associated with characteristics of said extraction pipe (2);
   communication means positioned in proximity to a wellbore, designed to read the first and second RFID identifiers intended for use in said wellbore, and to display in sequence the first and second RFID identifiers used in said wellbore as well as a selection of characteristics of said extraction pipe (2).

6. The assembly according to claim 1, further including two thread protectors (1) of said extraction pipe (2), each of said protectors including a tubular body, a thread complementary to said thread of the extraction pipe and a free end.

7. The assembly according to claim 6, wherein said protectors (1) are formed by injection of polycarbonate, of thermoplastic polyurethane, of high-density polyethylene, of polypropylene or of acrylonitrile butadiene styrene, possibly reinforced by metal, metal-plastic or composite parts.

8. The assembly according to claim 6, also including a cap (16) connected to each of said protectors (1), the module (3) being designed to be positioned on said cap (16) of the protector (1).

9. The assembly according to claim 1, wherein the removable connection between said extraction pipe (2) and the module (3) includes a closure element (60) designed to serve as a telltale showing breakage of the connection between the module (3) and the extraction pipe (2).

10. The assembly according to claim 1, wherein said module (3) is associated with a means of geographic location.

11. The system according to claim 5, further including two extraction pipe protectors (1), respectively male and female, mounted on the male and female ends of the extraction pipe (2).

\* \* \* \* \*